३,३१२,६१९
2-SUBSTITUTED IMIDAZOLIDINES AND THEIR
LUBRICANT COMPOSITIONS
Billy Dale Vineyard, St. Louis, Mo., assignor to Monsanto Company, a corporation of Delaware
No Drawing. Filed Oct. 14, 1963, Ser. No. 316,111
20 Claims. (Cl. 252—47.5)

This invention relates to new 2-substituted imidazolidines useful as detergents in lubricating oil compositions. Under the conditions encountered in a large percentage of present-day automobile driving (i.e., the so-called stop-and-go driving), automobile engines do not attain their most desirable and efficient operating temperatures. As a result, large quantities of undesirable products are formed which eventually find their way into the crankcase where they tend to deposit on the internal parts of the engine resulting in further inefficient engine operation. In present-day practice, deposition of such products is minimized by incorporating into lubricating oils metal-containing detergents. The use of metal-containing detergents may, however, form ash deposits in the combustion chambers of engines, fouling the spark plugs and creating other problems and, accordingly, it is the desire of those working in the art to find suitable detergents which are metal-free or ashless.

It has now been found that certain 2-substituted imidazolidines are useful as metal-free or ashless detergents in lubricating oil compositions and especially where such compositions are used at relatively low engine temperatures. The 2-substituted imidazolidines, referred to herein as imidazolidines, which are the subject of the present invention can be represented by the structure

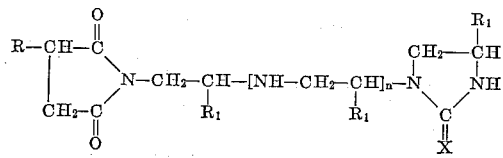

where R is a polyalkenyl radical having a molecular weight of from about 500 to about 2500, preferably about 800 to about 1500; $R_1$ is selected from hydrogen and an alkyl radical containing from one to three carbon atoms; $n$ is a whole number from 0 to 3; and X is selected from oxygen, sulfur and NH.

The 2-substituted imidazolidines of this invention can be prepared by reacting (a) a polyalkenylsuccinic anhydride represented by the structure

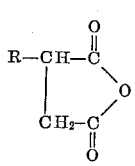

or the acid thereof, with
(b) a polyalkylenepolyamine, referred to herein as a polyamine, represented by the structure

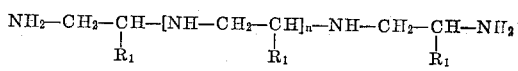

to produce an intermediate product, an imide, represented by the structure

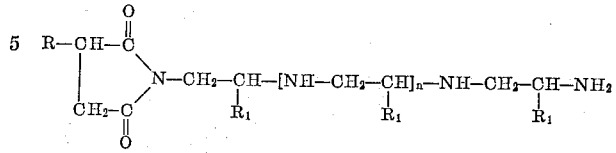

which is then reacted with
(c) urea, thiourea or guanidine, represented by the structure

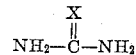

where R, $R_1$, $n$ and X have their aforedescribed significance. The mol ratios of (a):(b):(c) used are about 1:1:1, respectively.

The polyalkenylsuccinic anhydrides useful in preparing the imidazolidines of this invention can be prepared from a polymer of a lower olefin or a copolymer of lower olefins, for example, polymers of ethylene, propylene, butylene, isobutylene and mixtures or copolymers thereof, having a molecular weight of from about 500 to about 2500, but preferably about 800 to about 1500. The preparation of the polyalkenylsuccinic anhydrides is best effected at temperatures of the order of about 150° C. to 250° C. by reacting maleic anhydride with the olefin polymer in mol ratios of from 1:1 to about 5:1, respectively. Since the reaction between the olefin and maleic anhydride may not go to completion, the resulting polyalkenylsuccinic anhydride can contain some unreacted olefin which can be allowed to remain as a diluent with no harmful effects upon the performance of the compounds of this invention.

The polyamines useful in preparing the imidazolidines of the present invention which are available commercially, but which can also be prepared from alkylene dichlorides and ammonia, are represented by the following examples: diethylenetriamine, dipropylenetriamine, dibutylenetriamine, dipentylenetriamine, triethylenetetramine, tripropylenetetramine, tetraethylenepentamine, pentaethylenehexamine, and the like.

As is evident from the description of the compounds of this invention when X is oxygen reactant (c) is urea, when X is sulfur reactant (c) is thiourea, and when X is NH reactant (c) is guanidine.

The various imides resulting from the first step in the preparation of the imidazolidines of the present invention can be, as heretofore mentioned, represented by the structure

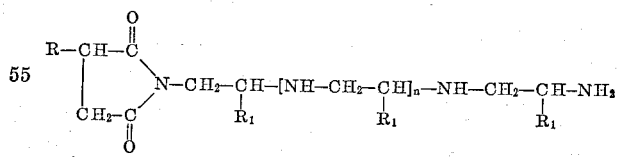

where R, $R_1$ and $n$ have their aforedescribed significance. Such imides can be prepared by heating a polyalkenylsuccinic anhydride and a polyamine at temperatures of the order of about 75° C. to about 175° C., using mol ratios of anhydride to polyamine of about 1:1 while at the same time continuously removing the water formed from the reaction.

Typical examples of the imides used to prepare the imidazolidines of this invention are given below. In naming the imides and imidazolidines herein, the approximate molecular weight of the polyalkenyl chain is denoted by the number in parentheses after the name of the polyalkenyl group in a particular compound.

5-[polyethenyl(500)succinimido]-3-azapentylamine,
5-[polypropenyl(700)succinimido]-3-azapentylamine,
5-[polybutenyl(900)succinimido]-3-azapentylamine,
8-[polyethenyl(1500)succinimido]-3,6-diazaoctylamine,
8-[polybutenyl(1800)succinimido]-3,6-diazaoctylamine,
8-[polybutenyl(980)succinimido]-3,6-diazaoctylamine,
11-[polybutenyl(1350)succinimido]-3,6,9-triazaundecylamine,
11-[polybutenyl(2400)succinimido]-3,6,9-triazaundecylamine, and the like.

The imides, as described above, can then be reacted with urea, thiourea or guanidine, by heating therewith at temperatures of the order of 120° C. to 200° C., while continuously removing the ammonia formed from the reaction, to provide the imidazolidines of this invention typical examples of which are:

1 - [2 - (polybutenyl(980)succinimido)ethyl]-2-imidazolidinone,
1 - [2 - (polypropenyl(1200)succinimido)ethyl] - 2 - imidazolidinone,
1 - [5 - (polybutenyl(1350)succinimido) - 3-azapentyl]-2-imidazolidinone,
1 - [8 - (polypropenyl(700)succinimido)-3,6-diazaoctyl]-2-imidazolidinone,
1 - [8-(polybutenyl(2100)succinimido)-3,6-diazaoctyl]-2-imidazolidinone,
1 - [11 - (polybutenyl(1350)succinimido) - 3,6,9-triazaundecyl]-2-imidazolidinone,
1 - [11 - (polyisobutenyl(1000)succinimido)-3,6,9-triazaundecyl]-2-imidazolidinone,
1 - [11 - (polybutenyl(1900)succinimido) - 3,6,9-triazaundecyl]-2-imidazolidinone,
1 - [2 - (polypropenyl(2400)succinimido)ethyl]-2-imidazolidinethione,
1 - [8 - (polybutenyl(900)succinimido)-3,6-diazaoctyl]-2-imidazolidinethione,
1 - [11 - (polybutenyl(500)succinimido) - 3,6,9 - triazaundecyl]-2-imidazolidinethione,
2 - imino - 1-[2-(polyisobutenyl(1000)succinimido)ethyl] imidazolidine,
2 - imino - 1 - [8-(polyethenyl(1500)succinimido)-3,6-diazaoctyl]-imidazolidine, and the like.

To provide a reaction medium and to facilitate the removal of the water of reaction, the preparation of the intermediate product, that is, the imides, is generally carried out in a hydrocarbon solvent, e.g., toluene or xylene. Likewise the preparation of the imide can be carried out in a mineral oil solution or dispersion. The mineral oil can also be used in combination with a hydrocarbon solvent. However, at the end of the imide production, it is preferable that the hydrocarbon solvent, if such is used, be stripped off and the remainder of the preparation conducted in a mineral oil solution to facilitate the removal of the ammonia formed during the preparation of the imidazolidines. This procedure is especially desirable because the imidazolidines are thereby produced in solution in a medium suitable for blending with other oils and additives.

The preparation of the imidazolidines of this invention is illustrated in the following non-limiting detailed examples, wherein parts are parts by weight unless otherwise stated.

EXAMPLE 1

Into a suitable reaction vessel fitted with a mechanical stirrer, heating mantle, thermometer, Dean-Stark trap and condenser, containing 900 parts of polybutenyl(980)succinic anhydride in toluene, there was charged 103 parts of triethylenetetramine. The resulting solution was refluxed at 153° C. for 5 hours as the water evolving from the reaction was removed. When the evolution and collection of water had ceased the toluene was stripped under vacuum and the product diluted with 498 parts of process oil. Subsequently 42.8 parts of urea were added to the oil solution of the imide which was at a temperature of about 40° C. The mixture was heated up to about 185° C. and kept there about 3 hours until the evolution of ammonia had ceased. The product was filtered to give 1500 parts of 1-[5-(polybutenyl(980)succinimido)-3-azapentyl]-2-imidazolidinone in solution in oil.

Additional examples of other imidazolidines of this invention and the materials used for their preparation are given in Table I, below. In the table only the alkenyl, or polyalkenyl, portion of the polyalkenylsuccinic anhydride and the average molecular weight of such portion are given, DETA means diethylenetriamine and TEPA means tetraethylenepentamine.

TABLE I

| Example No. | Alkenyl portion of Alkenylsuccinic Anhydride (mol wt. of Alkenyl group) | Polyamine | Urea Type Compound | 2-Substituted Imidazolidine |
|---|---|---|---|---|
| 2 | Polybutenyl(980) | DETA | Urea | 1-[2-(polybutenyl(980)succinimido)ethyl]-2-imidazolidinone. |
| 3 | Polybutenyl(1190) | TEPA | do | 1-[8-(polybutenyl(980)succinimido)-3,6-diazaoctyl]-2 imidazolidinone. |
| 4 | Polybutenyl(1350) | TEPA | do | 1-[8-(polybutenyl(1350)succinimido)-3,6-diazaoctyl] 2 imidazolidinone. |
| 5 | Polybutenyl(980) | DETA | Thiourea | 1-[2-(polybutenyl(980)succinimido)ethyl]-2-imidazolidinethione. |
| 6 | Polybutenyl(1350) | TEPA | Guanidine | 2-imino-1-[8-(polybutenyl(1350)succinimido)-3,6-diazaoctyl]-imidazolidine. |

In a similar manner the other imidazolidines contemplated by this invention can be prepared.

The imidazolidines of this invention can be used in lubricating oils in amounts of from about 0.05% to about 25% by weight. Additive concentrates of 60–95% are also contemplated. It has been found, however, that in finished formulations, for most applications, amounts of from about 0.25% to about 10% by weight are sufficient. In addition, the compounds of this invention can be used in fuel oils and in various light products, such as gasoline, wherein they also function as detergents or dispersants.

A screening test was utilized to demonstrate the detergency effectiveness in gasoline engine oil formulations of the imidazolidines of this invention. This test, referred to as a "Lacquer Deposition" test, involves passing partially oxidized gasoline through a sample of an oil formulation in a suitable container under controlled conditions, after which the sample is aged in an oven. The amount of deposit is then determined by washing away the oil. A control formulation is run simultaneously. The figure reported represents the percent reduction in deposits when a detergent is present as compared to the amount of deposit when no detergent is present. The great advantage of the Lacquer Deposition test is that the results obtained correlate well with the results which are obtained in low temperature gasoline engine tests such as the Lincoln Ms Test. Utilizing the above described test, the results presented in Table II, below, were obtained using a concentration of 2% by weight of the imidazolidine tested.

TABLE II

| Test No. | 2-Substituted Imidazolidine | Lacquer Deposition |
| --- | --- | --- |
| 1 | Example 1 | 90 |
| 2 | Example 2 | 69 |
| 3 | Example 3 | 92 |

From the above, it is clear that the addition to lubricating oils of the imidazolidines of the present invention brings with it a clear improvement of the dispersing and/or detergent qualities of said oils. Nevertheless the greater part of the commercial lubricating oils sold today are subject to a large number of uses, and it is, therefore, generally necessary to employ more than one type of additive in a finished lubricant composition. Thus, although the products of the present invention are effective detergents, it is frequently necessary to use such products in combination with other types of additives, such as metal-containing detergents and/or dispersants, corrosion inhibitors, oxidation inhibitors, extreme pressure agents, viscosity index improvers, pour-point depressors, antifoaming agents, and the like.

A particularly useful combination of additive intended to be applied in motor lubricants is the combination of an additive of the present invention and a metal-containing derivative of phosphorus such as a metal phosphorodithioate, eg., zinc dihexyl phosphorodithioate, the zinc salt of mixed alkyl phosphorodithioates where the alkyl groups are obtained, for example, from an equal mixture of isobutyl and n-amyl alcohols, and the metal salts of phosphorus sulfide-olefin polymer reaction products and combinations thereof.

Lubricating oils which can be used as the base oils to which the new compounds of this invention are added are not limited as far as detergent effects are concerned, and, accordingly, can be lubricating oils which are of a naphthenic base, paraffinic base, and other hydrocarbon bases, as well as lubricating oils derived from coal products and synthetic oils, such as alkylene polymers, alkylene oxide polymers, dicarboxylic acid esters, alkylated benzenes, silicate esters, silicon polymers, and the like, are suitable.

In addition to the above, it has been found that by utilizing the same reactants as are used to prepare the imidazolidines of the present invention, but in molar ratios other than about 1:1:1, products can be prepared which also exhibit outstanding detergent properties. Thus, it has been found that by interacting (a) a polyalkenylsuccinic anhydride, (b) a polyamine, and (c) urea, thiourea or guanidine, as aforedescribed, in mol ratios of (b):(c) of from about 1:0.75 to 1:1.2, preferably about 1:1, and mol rations of (a):(b) of from above 1:1, respectively, to about 1.6:1, respectively, preferably from about 1.1:1 to 1.4:1, respectively, reaction products are formed whose structure is unknown, but which can be used as ashless detergent additives in all types of lubricating oils.

The amount of excess polyalkenylsuccinic anhydride used (relative to the polyamine) is important since large excesses above about 60% tend to reduce the advantageous qualities of the products. Accordingly, the amount of excess polyalkenylsuccinic anhydride should range from more than 0% to about 60%. Engine test experience with the various products encompassed by this part of my invention has shown that the amount of such excess is preferably from about 10% to about 40%.

The amount of excess or deficiency of urea, thiourea or guanidine (relative to the polyamine) can vary from a mol ratio of 1:1.2 to 1:0.75, respectively, as mentioned above. However, mol ratios of about 1:1 are preferred since a loss of detergency is experienced at ratios significantly different than 1:1 and, beyond the range of ratios mentioned, the resulting products are commercially unsatisfactory detergents.

To provide a reaction medium and to facilitate the removal of the water and ammonia of the reaction, a hydrocarbon solvent or mineral oil or combination thereof can be used as more fully described with reference to the preparation of the imidazolidines. Suitable temperatures for preparing the reaction products at atmospheric pressure are on the order of 50° C. to 250° C., preferably from 120° C. to 200° C.

The raw materials (a), (b) and (c) can be reacted in indifferent order, and in portions, if desired, as is more fully illustrated in the following examples. The preparation of products using (a) a polyalkenylsuccinic anhydride, (b) a polyamine and (c) a urea, thiourea or guanidine in various mol ratios is illustrated in the following non-limiting examples wherein parts are parts by weight. In carrying out the reaction heating of reactants is always continued until the formation of by-product ammonia stops.

EXAMPLE 7

In this example the mol ratio of reactants (a):(b):(c) was 1.2:1:1, respectively.

Into a suitable reaction vessel, fitted as previously described, and containing 1520 parts of polybutenyl(980) succinic anhydride (1.2 mol) in toluene, there were charged 189 parts of tetraethylenepentamine (1.0 mol) and the mixture was refluxed until the evolution and collection of water ceased. The toluene was then stripped off and 60 parts of urea (1.0 mol) along with 858 parts of process oil were charged to the reaction mixture. Heating was continued at 180 to 190° C. until the evolution of ammonia ceased to provide a reaction product of 2575 parts in solution in oil.

EXAMPLE 8

In this example the mol ratio of (a):(b):(c) was 1.1:1:1, respectively.

Into a suitable reaction vessel, fitted as previously described there were charged 705 parts of polybutenyl(980) succinic anhydride (0.55 mol), 94.5 parts of tetraethylene pentamine (0.5 mol), 30 parts of urea (0.5 mol) and 401 parts of process oil. This reaction mixture was then heated at 185° C. until the evolution and collection of by-product water and ammonia had ceased to give 1300 parts of product in solution in oil.

EXAMPLE 9

In this example the mol ratios of (a):(b):(c) was 1.4:1:1, respectively.

Into a suitable reaction vessel, fitted as previously described, containing 94.5 parts of tetraethylenepentamine (0.5 mol) in toluene there were charged 895 parts of polybutenyl(980)succinic anhydride (0.7 mol). The reaction mixture was refluxed until the evolution and collection of water ceased and the toluene was stripped off. Consequently, 30 parts of urea (0.5 mol) in 488 parts of process oil were added to the reaction mixture. The mixture was then heated at 170° to 180° C. until the evolution of ammonia ceased to yield 1460 parts of product in solution in oil.

EXAMPLE 10

In this example the mol ratios of (a):(b):(c) was 1.2:1:1, respectively.

Into a suitable reaction vessel, fitted as previously described, and containing 73 parts of triethylenetetramine (0.5 mol) in toluene there were charged 1080 parts of polybutenyl(1350)succinic anhydride (0.6 mol). The reaction mixture was refluxed until the evolution and collection of water ceased and the toluene was then stripped off. Finally, 30 parts of urea (0.5 mol) along with 570 parts of process oil were added to the mixture followed by heating until the evolution of ammonia ceased, leaving 1735 parts of product in solution in oil.

The reaction products disclosed herein can be used in lubricating oils in amounts of from about 0.05% to about 25% by weight. Additive concentrates of 60–95% are also contemplated. It has been found, however, that in finished formulations, for most applications, amounts of from about 0.25% to about 10% by weight are sufficient. In addition, the reaction products of this invention can be used in fuel oils and in various light products, such as gasoline, wherein they also function as detergents or dispersants.

Although it is clear that the addition to lubricating oils of the reaction products described herein brings with it a clear improvement of the dispersing and/or detergent qualities of said oils, nevertheless the greater part of the commercial oils sold today are subject to a large number of uses, and it is, therefore, generally necessary to employ more than one type of additive in a finished lubricant composition. Thus, although the reaction products prepared above are effective detergents, it is frequently necessary to use such products in combination with other types of additives, such as metal-containing detergents and/or dispersants, corrosion inhibitors, oxidation inhibitors, extreme pressure agents, viscosity index improvers, pour-point depressors, anti-foaming agents, and the like.

The lubricating oils which can be used as the base oils to which the reaction products disclosed herein are added are not limited as far as detergent effects are concerned, and, accordingly, can be the lubricating oils heretofore described.

While this invention has been described with respect to various specific examples and embodiments, it is understood that the invention is not limited thereto and that it can be variously practiced within the scope of the following claims.

The embodiments of the invention in which an exclusive property or privilege is claimed are defined as follows:

1. A compound represented by the structure $$\begin{array}{c} \text{R--CH--C} \overset{O}{\underset{\parallel}{}} \\ \quad\quad\quad\quad\quad\quad\quad\quad\quad\quad\quad\quad\quad\text{CH}_2\text{--CH--}R_1 \\ \quad\quad\quad\quad\quad\text{N--CH}_2\text{--CH--[NH--CH}_2\text{--CH]}_n\text{--N}\quad\quad\text{N} \\ \text{CH}_2\text{--C} \overset{O}{\underset{\parallel}{}} \quad\quad\quad R_1 \quad\quad\quad\quad\quad\quad\quad R_1 \quad\quad\quad\quad C \\ \quad\quad\quad\quad\quad\quad\quad\quad\quad\quad\quad\quad\quad\quad\quad\quad\quad\quad\quad\quad\quad\parallel \\ \quad\quad\quad\quad\quad\quad\quad\quad\quad\quad\quad\quad\quad\quad\quad\quad\quad\quad\quad\quad\quad X \end{array}$$

where R is a polyalkenyl radical having a molecular weight of from about 500 to about 2500; $R_1$ is selected from the group consisting of hydrogen and an alkyl radical containing from one to three carbon atoms; $n$ is a whole number from 0 to 3; and X is selected from the group consisting of oxygen, sulfur and NH.

2. A compound of claim 1 where R is a polybutenyl of an average molecular weight of from about 800 to 1500.

3. A compound of claim 1 where R is polybutenyl of an average molecular weight of from about 800 to about 1500, $R_1$ is hydrogen and X is oxygen.

4. 1-[5-(polybutenylsuccinimido)-3-azapentyl]-2-imidazolidinone in which the polybutenyl group has an average molecular weight of about 1000.

5. 1-[5-(polybutenylsuccinimido)-3-azapentyl]-2-imidazolidinone in which the polybutenyl group has an average molecular weight of about 1350.

6. 1-[8-(polybutenylsuccinimido)-3,6-diazaoctyl]-2-imidazolidinone in which the polybutenyl group has an average molecular weight of about 1200.

7. A composition comprising a lubricating oil and a compound of claim 1.

8. A composition comprising a lubricating oil and a compound of claim 3.

9. A composition comprising a lubricating oil and a compound of claim 4.

10. A composition comprising a lubricating oil and a compound of claim 6.

11. The product prepared by the interaction of
(a) a polyalkenylsuccinic anhydride in which the polyalkenyl group is an olefin polymer of an average molecular weight of from about 500 to about 2500;
(b) a polyamine, represented by the structure $$\text{NH}_2\text{--CH}_2\text{--CH--[NH--CH}_2\text{--CH]}_n\text{--NH--CH}_2\text{--CH--NH}_2$$
$$\quad\quad\quad\quad\quad\; R_1 \quad\quad\quad\quad\quad\quad R_1 \quad\quad\quad\quad\quad\quad R_1$$

where $R_1$ is selected from the group consisting of hydrogen and an alkyl radical containing from one to three carbon atoms, and $n$ is a whole number from 0 to 3; and
(c) a compound selected from the group consisting of urea, thiourea, and guanidine, the mol ratio of (a):(b) being from above 1:1, respectively, to about 1.6:1, respectively, and the mol ratio of (b):(c) being from about 1:0.75, respectively, to about 1:1.2, respectively.

12. The product prepared by the interaction of
(a) a polyalkenylsuccinic anhydride in which the polyalkenyl group is an olefin polymer of an average molecular weight of from about 800 to about 1500;
(b) a polyamine, represented by the structure $$\text{NH}_2\text{--CH}_2\text{--CH--[NH--CH}_2\text{--CH]}_n\text{--NH--CH}_2\text{--CH--NH}_2$$
$$\quad\quad\quad\quad\quad\; R_1 \quad\quad\quad\quad\quad\quad R_1 \quad\quad\quad\quad\quad\quad R$$

where $R_1$ is selected from the group consisting of hydrogen and an alkyl radical containing from one to three carbon atoms, and $n$ is a whole number from 0 to 3; and
(c) a compound selected from the group consisting of urea, thiourea and guanidine, the mol ratio of (a):(b) being from about 1.1:1 to about 1.4:1, respectively and the mol ratio of (b):(c) being about 1:1, respectively.

13. The product prepared by the interaction of
(a) a polyalkenylsuccinic anhydride in which the polyalkenyl group is a butylene polymer of an average molecular weight of from about 800 to about 1500;
(b) a polyamine represented by the structure $$\text{NH}_2\text{--CH}_2\text{--CH}_2\text{--[NH--CH}_2\text{--CH}_2]_n$$
$$\quad\quad\quad\quad\quad\quad\quad\quad\quad\quad\text{--NH--CH}_2\text{--CH}_2\text{--NH}_2$$

where $n$ is a whole number from 0 to 3; and
(c) a compound selected from the group consisting of urea, thiourea, and guanidine, the mol ratio of (a):(b):(c) being from about 1.1 to 1.4:1:1, respectively.

14. The product prepared by the interaction of
(a) a polyalkenylsuccinic anhydride in which the polyalkenyl group is a butylene polymer of an average molecular weight of from about 800 to about 1500;
(b) a polyamine represented by the structure
$$\text{H}_2\text{N--CH}_2\text{--CH}_2\text{--[NH--CH}_2\text{--CH}_2]_2$$
$$\quad\quad\quad\quad\quad\quad\quad\quad\quad\quad\text{--NH--CH}_2\text{--CH}_2\text{--NH}_2$$
(c) a compound selected from the group consisting of urea, thiourea, and guanidine, the mol ratio of (a):(b):(c) being from about 1.1 to 1.4:1:1, respectively.

15. The product prepared by the interaction of
(a) a polyalkenylsuccinic anhydride in which the polyalkenyl group is a butylene polymer of an average molecular weight of from about 800 to about 1500;
(b) tetraethylenepentamine; and
(c) urea, the mol ratio of (a):(b):(c) being about 1.2:1:1, respectively.

16. The product prepared by the interaction of
(a) a polyalkenyl succinic anhydride in which the polyalkenyl group is a butylene polymer of an average molecular weight of from about 800 to about 1500;
(b) tetraethylenepentamine;
(c) thiourea, the mol ratio of (a):(b):(c) being about 1.2:1:1, respectively.

17. The product prepared by the interaction of
(a) a polyalkenylsuccinic anhydride in which the polyalkenyl group is a butylene polymer of an average molecular weight of from about 800 to about 1500;
(b) tetraethylenepentamine; and
(c) guanidine,
the mol ratio of (a):(b):(c) being about 1.2:1:1, respectively.

18. A composition comprising a lubricating oil and a product of claim 11.

19. A composition comprising a lubricating oil and a product of claim 12.

20. A composition comprising a lubricating oil and a product of claim 14.

References Cited by the Examiner
UNITED STATES PATENTS

| | | | |
|---|---|---|---|
| 2,568,876 | 9/1951 | White et al. | 252—51.5 |
| 2,980,652 | 4/1961 | Melamed et al. | 260—309.7 |
| 3,018,250 | 1/1962 | Anderson et al. | 252—51.5 |
| 3,024,195 | 3/1962 | Drummond et al. | 252—51.5 |
| 3,194,792 | 7/1965 | Emmons et al. | 260—309.7 |
| 3,194,812 | 7/1965 | Norman et al. | 252—51.5 |
| 3,200,076 | 8/1965 | Anderson et al. | 252—51.5 |
| 3,219,666 | 11/1965 | Norman et al. | 252—51.5 |

DANIEL E. WYMAN, *Primary Examiner.*

L. G. XIARHOS, *Assistant Examiner.*